US007630511B2

(12) United States Patent
Zhao et al.

(10) Patent No.: US 7,630,511 B2
(45) Date of Patent: Dec. 8, 2009

(54) APPARATUS AND METHODS FOR IMPROVING DETECTION OF WATERMARKS IN CONTENT THAT HAS UNDERGONE A LOSSY TRANSFORMATION

(75) Inventors: Jian Zhao, Rumford, RI (US); Justin Picard, Providence, RI (US); Niels Thorwirth, Providence, RI (US)

(73) Assignee: Thomson Licensing, Boulogne-Billancourt (FR)

( * ) Notice: Subject to any disclaimer, the term of this patent is extended or adjusted under 35 U.S.C. 154(b) by 693 days.

(21) Appl. No.: 10/923,946

(22) Filed: Aug. 23, 2004

(65) Prior Publication Data

US 2005/0025338 A1 Feb. 3, 2005

Related U.S. Application Data

(62) Division of application No. 10/287,206, filed on Nov. 4, 2002, now Pat. No. 6,782,116.

(51) Int. Cl.
*G06K 9/00* (2006.01)
(52) U.S. Cl. ...................................... 382/100; 380/200
(58) Field of Classification Search .................. 382/100
See application file for complete search history.

(56) References Cited

U.S. PATENT DOCUMENTS

| | | | | | |
|---|---|---|---|---|---|
| 4,790,566 | A | * | 12/1988 | Boissier et al. | ................ 283/91 |
| 5,319,453 | A | * | 6/1994 | Copriviza et al. | ............... 346/6 |
| 5,384,846 | A | * | 1/1995 | Berson et al. | ................ 713/186 |
| 5,414,258 | A | | 5/1995 | Liang et al. | |
| 5,502,576 | A | | 3/1996 | Ramsay et al. | |
| 5,636,292 | A | * | 6/1997 | Rhoads | ........................ 382/232 |
| 5,664,018 | A | | 9/1997 | Leighton | |
| 5,710,834 | A | * | 1/1998 | Rhoads | ........................ 382/232 |
| 5,745,604 | A | * | 4/1998 | Rhoads | ........................ 382/232 |

(Continued)

FOREIGN PATENT DOCUMENTS

WO    WO 02/087221 A1    10/2002

OTHER PUBLICATIONS

C. Dautzenberg, Watermarking Images:, Department of Microelectronics and Electrical Engineering, Trinity College, Oct. 1994, pp. 1-47.

(Continued)

*Primary Examiner*—Sath V. Perungavoor
(74) *Attorney, Agent, or Firm*—Robert D. Shedd; Joseph J. Opalach; Jerome G. Schaefer

(57) ABSTRACT

Techniques for watermarking sequences of digital representations and detecting the watermarks in the digital representations. One of the techniques is used when the message that is contained in a watermark belonging to a digital representation that is derived from an original watermarked digital representation cannot be decoded. The technique obtains information about the watermark by comparing the watermark vector for the watermark that cannot be decoded with a replica of the watermark vector from the original watermarked digital representation. The replica is made using the message. Depending on the degree of similarity, the watermark's presence and some of its characteristics may be determined. Another technique improves the robustness of watermarks that are used for authentication by employing a short (eve single-bit) watermark vector to make the watermark and using the message needed for the authentication to determine where the watermark is located in the digital representation.

11 Claims, 9 Drawing Sheets

U.S. PATENT DOCUMENTS

| | | | | |
|---|---|---|---|---|
| 5,748,783 | A | * | 5/1998 | Rhoads .................... 382/232 |
| 5,768,426 | A | * | 6/1998 | Rhoads .................... 382/232 |
| 5,786,587 | A | * | 7/1998 | Colgate, Jr. ................ 235/487 |
| 5,799,092 | A | * | 8/1998 | Kristol et al. .............. 380/51 |
| 5,835,639 | A | * | 11/1998 | Honsinger et al. ......... 382/278 |
| 5,841,886 | A | * | 11/1998 | Rhoads .................... 382/115 |
| 5,892,900 | A | | 4/1999 | Ginter et al. |
| 5,920,861 | A | | 7/1999 | Hall et al. |
| 5,946,414 | A | | 8/1999 | Cass et al. |
| 5,949,885 | A | * | 9/1999 | Leighton .................... 380/54 |
| 5,960,081 | A | | 9/1999 | Vynne et al. |
| 5,974,150 | A | | 10/1999 | Kaish et al. |
| 5,974,548 | A | | 10/1999 | Adams |
| 5,984,366 | A | * | 11/1999 | Priddy ........................ 283/72 |
| 5,991,426 | A | | 11/1999 | Cox et al. |
| 6,024,287 | A | * | 2/2000 | Takai et al. ................. 235/493 |
| 6,044,156 | A | * | 3/2000 | Honsinger et al. .......... 380/54 |
| 6,044,182 | A | * | 3/2000 | Daly et al. .................. 382/284 |
| 6,108,434 | A | * | 8/2000 | Cox et al. ................... 382/100 |
| 6,122,392 | A | * | 9/2000 | Rhoads ....................... 382/100 |
| 6,122,403 | A | * | 9/2000 | Rhoads ....................... 382/233 |
| 6,154,571 | A | * | 11/2000 | Cox et al. ................... 382/250 |
| 6,185,312 | B1 | * | 2/2001 | Nakamura et al. .......... 382/100 |
| 6,192,138 | B1 | | 2/2001 | Yamadaji |
| 6,243,480 | B1 | * | 6/2001 | Zhao et al. .................. 382/100 |
| 6,278,385 | B1 | | 8/2001 | Kondo et al. |
| 6,278,792 | B1 | * | 8/2001 | Cox et al. ................... 382/100 |
| 6,285,774 | B1 | * | 9/2001 | Schumann et al. .......... 382/100 |
| 6,285,775 | B1 | * | 9/2001 | Wu et al. .................... 382/100 |
| 6,285,776 | B1 | * | 9/2001 | Rhoads ....................... 382/100 |
| 6,289,108 | B1 | * | 9/2001 | Rhoads ....................... 382/100 |
| 6,292,092 | B1 | * | 9/2001 | Chow et al. ................. 340/5.6 |
| 6,343,138 | B1 | * | 1/2002 | Rhoads ....................... 382/100 |
| 6,373,974 | B2 | * | 4/2002 | Zeng ........................... 382/135 |
| 6,385,329 | B1 | | 5/2002 | Sharma et al. |
| 6,389,151 | B1 | * | 5/2002 | Carr et al. ................... 382/100 |
| 6,411,725 | B1 | * | 6/2002 | Rhoads ....................... 382/100 |
| 6,418,232 | B1 | * | 7/2002 | Nakano et al. .............. 382/100 |
| 6,442,284 | B1 | * | 8/2002 | Gustafson et al. ........... 382/100 |
| 6,449,377 | B1 | | 9/2002 | Rhoads |
| 6,449,378 | B1 | * | 9/2002 | Yoshida et al. .............. 382/100 |
| 6,487,301 | B1 | * | 11/2002 | Zhao ........................... 382/100 |
| 6,519,351 | B2 | * | 2/2003 | Kimura et al. .............. 382/100 |
| 6,535,614 | B1 | * | 3/2003 | Kimura et al. .............. 382/100 |
| 6,535,617 | B1 | * | 3/2003 | Hannigan et al. ........... 382/100 |
| 6,546,112 | B1 | * | 4/2003 | Rhoads ....................... 382/100 |
| 6,563,937 | B1 | * | 5/2003 | Wendt ........................ 382/100 |
| 6,574,350 | B1 | | 6/2003 | Rhoads et al. |
| 6,590,996 | B1 | | 7/2003 | Reed et al. |
| 6,608,911 | B2 | * | 8/2003 | Lofgren et al. .............. 382/100 |
| 6,625,297 | B1 | * | 9/2003 | Bradley ...................... 382/100 |
| 6,721,440 | B2 | | 4/2004 | Reed et al. |
| 6,725,372 | B1 | | 4/2004 | Lewis et al. |
| 6,741,991 | B2 | * | 5/2004 | Saito ........................... 707/9 |
| 6,751,336 | B2 | * | 6/2004 | Zhao ........................... 382/100 |
| 6,782,116 | B1 | * | 8/2004 | Zhao et al. .................. 382/100 |
| 6,788,800 | B1 | * | 9/2004 | Carr et al. ................... 382/100 |
| 6,795,565 | B2 | * | 9/2004 | Wendt ........................ 382/100 |
| 6,885,757 | B2 | * | 4/2005 | Bloom et al. ............... 382/100 |
| 7,016,516 | B2 | * | 3/2006 | Rhoads ....................... 382/100 |
| 7,043,052 | B2 | * | 5/2006 | Rhoads ....................... 382/100 |
| 2001/0019618 | A1 | * | 9/2001 | Rhoads ....................... 382/100 |
| 2001/0022848 | A1 | * | 9/2001 | Rhoads ....................... 382/100 |
| 2001/0054644 | A1 | | 12/2001 | Liang |
| 2002/0002445 | A1 | | 1/2002 | Doliov |
| 2002/0009208 | A1 | * | 1/2002 | Alattar et al. ............... 382/100 |
| 2002/0012445 | A1 | * | 1/2002 | Perry .......................... 382/100 |
| 2002/0076083 | A1 | | 6/2002 | Levy |
| 2002/0118871 | A1 | | 8/2002 | Jones et al. |
| 2002/0157005 | A1 | * | 10/2002 | Brunk et al. ................. 713/176 |
| 2002/0178368 | A1 | * | 11/2002 | Yin et al. .................... 713/186 |
| 2003/0002710 | A1 | * | 1/2003 | Rhoads ....................... 382/100 |
| 2003/0012401 | A1 | * | 1/2003 | Sharma et al. .............. 382/100 |
| 2003/0021439 | A1 | * | 1/2003 | Lubin et al. ................. 382/100 |
| 2003/0053653 | A1 | * | 3/2003 | Rhoads ....................... 382/100 |
| 2005/0033965 | A1 | * | 2/2005 | Iwamura ..................... 713/176 |

OTHER PUBLICATIONS

J. Zhao, "Look, It's Not There", Byte, McGraw-Hill Inc. St. Peterborough, US, vol. 22, No. 1, 1997, pp. 7-8, 10, 12, XP000199953, ISSN: 0360-5280.

D. Cross et al., "Watermarking for self-authentication of compressed video", Proceedings 2002 International conference on Image Processing, ICIP 2002, Rochester, NY, US, Sep. 22-25, 2002, IEEE, vol. 2 of 3, Sep. 22, 2002, pp. 913-916, XP010608121.

Zhong Hua et al., "A New Fragile Watermarking Technique for Image Authentication", Signal Processing, 2002 6th International Conference on Aug. 26-30, 2002, Piscataway, NJ, US, IEEE, vol. 1, Aug. 26, 2002, pp. 792-795, XP010628107.

R. Lancini et al., "A Robust Video Watermarking Technique for Compression and Transcoding Processing", Multimedia and Expo, 2002, ICME '02 Proceedings, 2002 IEEE International Conference on Lausanne, Switzerland Aug. 26-29, 2002, Piscataway, NJ, US, vol. 1, Aug. 26, 2002, pp. 549-552, XP010604427.

R. Bangaleea et al., "Performance Improvement of Spread Spectrum Spatial Domain Watermarking Scheme Through Diversity and Attack Characterisation", 2002 IEEE Africon 6th, Africon Conference in Africa, University of Pretoria, George, South Africa, Oct. 204, 2002, New York, NY, US, vol. 1 or 2, Cont. 6, Oct. 2, 2002, pp. 293-298, XP010621691.

R. Lancini et al., "A Robust Video Watermarking Technique in the Spatial Domain", Video/Image Processing and Multimedia Communications 4th Eurasip-IEEE Region 8 International Symposium on Viprocom, Jun. 16-19, 2002, Piscataway, NJ, US, Jun. 16, 2002, pp. 251-256, XP010598723.

D. Delannay et al., "Generalized 2-D Cyclic Patterns for Secret Watermark Generation", Image Processing, 2000, Proceedings 2000 International Conference on Sep. 10-13, 2000, Piscataway, NJ, US, IEEE, vol. 2, Sep. 10, 2000, pp. 77-79, XP010529927.

Zhao Yao et al., "Video Watermarking Scheme Resistant to Geometric Attacks", Proceedings 2002 International Conference on Image Processing, ICIP 2002, Rochester, NY, US, Sep. 22-25, 2002, IEEE, vol. 2 of 3, Sep. 22, 2002, pp. 145-148, XP010607929.

* cited by examiner

501

502

503

APPARATUS AND METHODS FOR IMPROVING DETECTION OF WATERMARKS IN CONTENT THAT HAS UNDERGONE A LOSSY TRANSFORMATION

CROSS REFERENCES TO RELATED APPLICATIONS

The present application is a divisional of U.S. Ser. No. 10/287,206, filed Nov. 4, 2002, which has the same inventors, title, and assignee as the present application. U.S. Ser. No. 10/287,206 is scheduled to issue as U.S. Pat. No. 6,782,116 on Aug. 24, 2004 and is hereby incorporated by reference in its entirety and for all purposes into the present patent application. Also incorporated by reference herein in their entireties and for all purposes are U.S. Pat. No. 6,243,480, Jian Zhao, et al., Digital authentication with analog documents, issued Jun. 5, 2001, and U.S. Pat. No. 6,359,985, Koch, et al., Procedure for marking binary coded data sets, issued Mar. 19, 2002.

BACKGROUND OF THE INVENTION

1. Field of the Invention

The invention relates generally to the watermarking of content that is represented by digital representations and more specifically to the problem of detecting watermarks in digital representations that have been derived via lossy transformations from an original watermarked digital representation.

2. Description of Related Art

Nowadays, the easiest way to work with pictures or sounds is often to make digital representations of them. Once the digital representation is made, anyone with a computer can copy the digital representation without degradation, can manipulate it, and can send it virtually instantaneously to anywhere in the world. The Internet, finally, has made it possible for anyone to distribute any digital representation from anywhere in the world From the point of view of the owners of the digital representations, there is one problem with all of this: pirates, too, have computers, and they can use them to copy, manipulate, and distribute digital representations as easily as the legitimate owners and users can. If the owners and users of the original digital representations are to be protected against illegal copiers or forgers of the digital representations, the digital representations themselves must be protected from pirates and forgers.

One technique that is widely used to make piracy and forgery more difficult is digital watermarking. A digital watermark is a modification of a digital representation so that it contains additional information. The modification is done in such a fashion that the additional information remains substantially invisible when an analog form of the digital representation is produced by printing or displaying the digital representation, but can be located and read by those who put the additional information into the digital representation. The additional information can be anything the maker of the watermark chooses, but when watermarks are used to make piracy or forgery more difficult, the additional information is typically ownership or copyright information about the digital representation or information that can be used to authenticate the digital representation or an analog form produced from the digital representation. For further information about watermarking, see Jian Zhao, "Look, It's Not There", in: BYTE Magazine, January, 1997. Detailed discussions of particular techniques for digital watermarking may be found in E. Koch and J. Zhao, "Towards Robust and Hidden Image Copyright Labeling", in: Proc. Of 1995 IEEE Workshop on Nonlinear Signal and Image Processing, Jun. 20-22, 1995, in U.S. Pat. No. 5,710,834, Rhoads, Method and Apparatus Responsive to a Code Signal Conveyed through a Graphic Image, issued Jan. 20, 1998, and in U.S. Pat. No. 6,359,985, Koch, et al., Technique for marking binary coded data sets, issued Mar. 19, 2002. For an example of a commercial watermarking system that uses the digital watermarking techniques disclosed in the Rhoads patent, see *Digimarc Watermarking Guide*, Digimarc Corporation, 1999, available at http://www.digimarc.com/support/cswater.htm in August, 2002. For an example of how digital watermarking may be used to authenticate analog forms, see U.S. Pat. No. 6,243,480, Jian Zhao, et al., Digital authentication with analog documents, issued Jun. 5, 2001.

A technical challenge in the implementation of digital watermarks is making them robust. A digital watermark is robust if it still can be detected when the content of the digital watermark has been altered, either by someone with malicious intent, or simply because the content has undergone a lossy transformation, that is, a transformation in which information is lost. Examples of transformations which may be lossy are a transformation from one kind of digital representation of the content to another kind of digital representation or compression of the digital representation of the content. The production of an analog form from the digital representation is always lossy, and physical wear of the analog form may cause further loss of information. When an analog form is scanned to produce a new digital representation, that transformation, too, is always lossy. Because of the inherent lossiness involved in producing and scanning analog forms and because analog forms are subject to physical wear, the robustness of a watermark is particularly important when it is used in the manner described in U.S. Pat. No. 6,243,480 to authenticate an analog document. It is an object of the present invention to improve the robustness of digital watermarks by improving the manner in which they are made and detected.

SUMMARY OF THE INVENTION

In one aspect, the invention concerns techniques for obtaining useful information from a watermark even where the watermark's content is unreadable. The kinds of information obtainable include whether the watermark is present at all and whether the watermark's content belongs to one of a small set of possibilities. These techniques all involve a particular digital representation that is supposed to have been derived from a watermarked original. The watermark in the original is made from a first watermark vector that in turn was produced using a message. When the particular digital representation is being examined, a second watermark vector is extracted from a portion of the particular digital representation which corresponds to the portion of the original in which the watermark is embedded and a third watermark vector is obtained, generally by obtaining the message and recomputing the watermark vector from the message. The third watermark vector and the second watermark vector are compared, and the degree of similarity of the second and third watermark vectors determines whether the particular digital representation contains the watermark at all and also the degree of relationship between the watermark in the particular digital representation and the watermark in the original. In one particularly useful variant, the message used to recompute the watermark vector is obtained from an analog document that is also the source of the particular digital representation.

In another aspect, the invention concerns techniques for increasing the robustness of watermarks that are used to authenticate the digital representations that contain them. In these techniques, a message is not used to produce the watermark's content, but instead to determine the watermark's location in the digital representation. The content need only indicate the presence of the watermark, and may thus consist of the value of a single bit. To determine whether a particular digital representation that is supposedly derived from an original that contains the watermark is authentic, the message is obtained and the locations which should contain the watermark in the particular digital representation are determined. The values at those locations are compared with the expected values for the watermark, and the authenticity of the document is determined on the basis of the comparison.

In still another aspect, the invention concerns techniques for determining whether a portion of a particular digital representation has been altered. The particular digital representation is derived from a watermarked original and the locations of the watermark in the original and the watermark's values are both known. Values from locations in the particular digital representation that correspond to locations of the watermarks in the original are compared with the values of the watermark in the original; altered portions of the particular digital representation may be determined from a less-than-expected frequency of occurrence of the values in the altered portions.

Yet another aspect of the invention concerns techniques for embedding and/or reading watermarks which take advantage of common characteristics of a class of digital representations or analog forms in which the watermarks are used. In these techniques, the digital representation containing the watermark is analyzed to determine favorable locations for the watermarks; a mask is made that specifies the favorable locations, and the mask is used in embedding and/or reading the watermarks. The mask may be static or dynamic and the analysis may be made according to the semantic importance of areas in the digital representation, according to how the digital representation is processed after the watermark is added, according to an optical characteristic of the digital representation, or according to a factor that may affect reading of the embedded watermark.

A further aspect of the invention concerns techniques for synchronizing digital representations in order to detect a watermark or for any other purpose. In the technique, a synchronization pattern of marks is added to a digital representation which has the characteristic that information external to the improved digital representation is necessary to automatically detect the marks making up the pattern. The external information may determine the locations of the marks in the digital representation. The locations may be determined relative to a feature of the digital representation. The external information that determines the locations may be a key. A location for a mark may be selected according to a characteristic of the digital representation at the location, and the content of the digital representation at the location may be modified to make detection of the mark Under normal conditions, the pattern is not perceptible to a viewer of an image made from the digital representation.

Another technique for synchronizing digital representations is used with sequences of digital representations. Here, the same predetermined portions of the content are selected as synchronization marks in each digital representation in the sequence and the value of each selected portion is changed by a predetermined amount. To detect the synchronization marks, one sums the digital representations in the sequence. The predetermined amounts may alternate between a positive and a negative amount and the locations of the synchronization marks may be determined using a key. The synchronization marks may be used to detect and reverse a transformation in the sequence of digital images.

Other objects and advantages will be apparent to those skilled in the arts to which the invention pertains upon perusal of the following Detailed Description and drawing, wherein:

Figure 1:
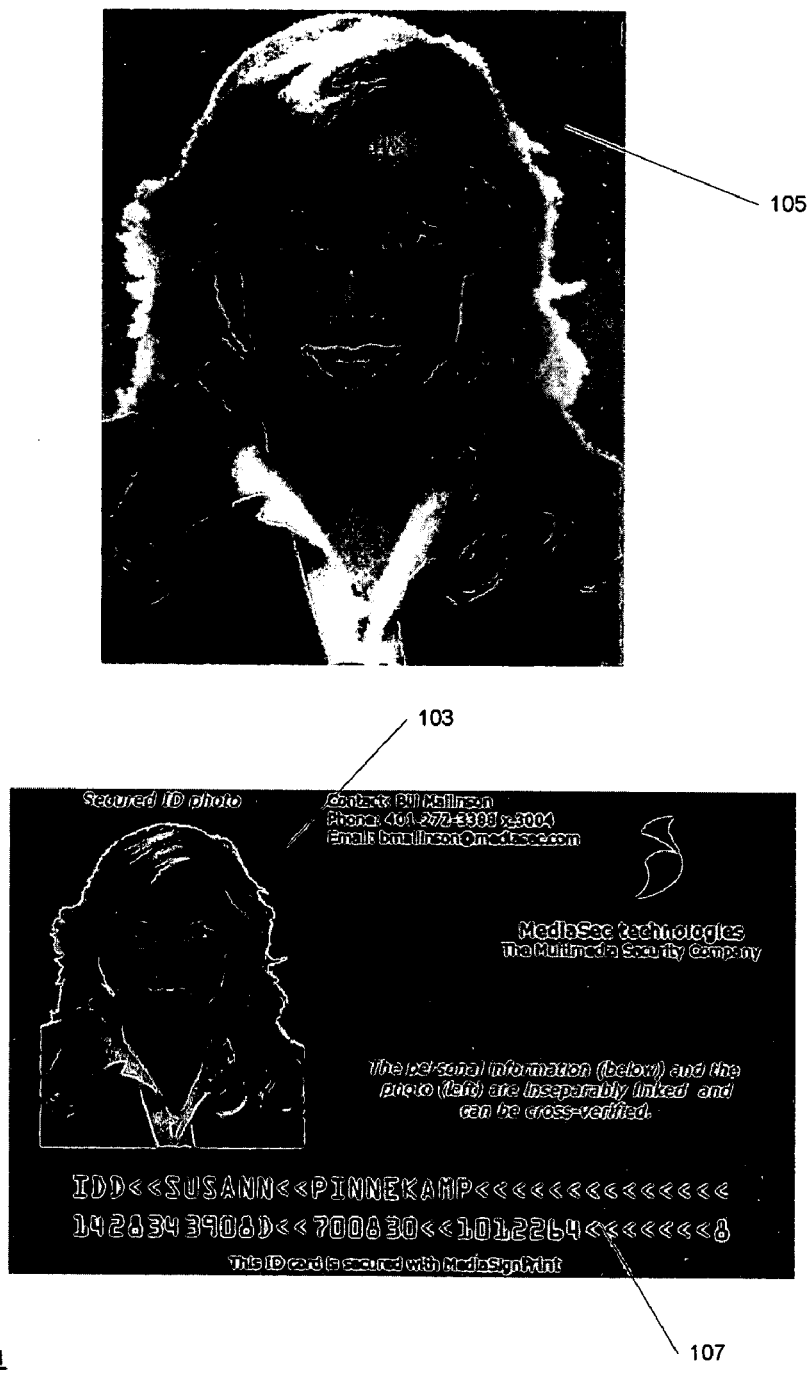
FIG. 1 shows an analog form upon which the method of FIG. 2 may be practiced.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will describe the following techniques for rendering watermarks more robust in detail:
   Techniques for determining whether a watermark is present in content that has undergone a lossy transformation;
   Adaptive techniques for weighting the embedding or detection of a watermark according to a characteristic of the medium from which the watermark is to be read.
   Techniques for using watermarks to determine where content has been altered; and
   Techniques for using registration patterns to locate watermarks and to calibrate image capturing devices to improve capture of watermarks.

Common to all of these techniques is their use of particular knowledge about the watermarked contents to improve the detection and reading of watermarks.

Obtaining Information from Undecodable Watermarks

The purpose of a digital watermark is to hide a message in the content of a digital representation. The message is the information that is the reason for the watermark's existence; what it is will depend on the watermark's purpose; for example, if the purpose of the watermark is authentication, the message is the information necessary to perform the authentication. The message may either be contained in the watermark or may determine the location of the watermark in the digital representation. The watermark is made using watermark information. The watermark information may not be related to the message at all, it may be simply a digital representation of the message, or the digital representation of the message may be further transformed. One example of such transformation is encrypting the message. The watermark is made from the watermark information by encoding the watermark information at predetermined locations in the digital representation. The encoding is done by changing the content of the digital representation at the predetermined locations. For example, if the digital representation is pixels, the encoding may set a predetermined bit in a predetermined pixel so that it corresponds to the value of a bit in the watermark information. In many cases, the predetermined locations are determined by a key. In the following, a list of the values in the predetermined locations will be termed a watermark vector.

Watermarks are decoded by watermark detectors. The watermark detector reverses the process by which the watermark was made. First, it obtains the watermark vector for the watermark. Then, it decodes the watermark information from the values in the watermark vector; finally, it obtains the message from the decoded watermark information. If a key was used to make the watermark, the watermark detector must use same key to locate the watermark vector; if the message was encrypted to make the watermark information, the watermark detector must decrypt the watermark information to obtain the message.

Before a watermark detector attempts to read the watermark's message from the content, the content may go through processes that involve lossy transformation. One example of such a transformation is JPEG compression and resealing. Another such transformation occurs if the content is put into analog form, for example by printing it, and the detector attempts to read a watermark from a digital image made by scanning the analog form. In this case, the printing and scanning processes, as well as physical wear of the analog form, are all lossy transformations. If enough information has been lost due to the lossy transformation, the watermark detector may not be able to decode the message encoded in the watermark.

Even when the watermark detector cannot decode the message contained in the watermark, the watermark in combination with information obtained from other sources about the watermark can provide useful information about the watermarked content. For example,

- it may be possible to determine whether the content was watermarked at all.
- it may be possible to determine whether the undecodable message was one of a small set of messages.
- it may be possible to partially recover the message.
- it may be possible to determine where the content has been altered.

All of these things can be done using the following basic approach:

1. Get enough information about how the undecodable watermark was made and embedded and what its message was to make a replica watermark vector w' of the watermark vector w for the original watermark.
2. Compute the similarity of the replica w' with watermark vector w" that the watermark reader obtained from the content that has undergone the lossy transformation.
3. Use the degree of similarity between replica watermark vector w' and watermark vector w" to determine whether there is in fact a watermark in the content at all and if there is such a watermark, further use details of the similarity to make more detailed conclusions about the watermark. Examples would be whether the message can be determined to belong to a small set of messages, whether the message is partially readable and whether the watermark reveals locations of alterations in the document.

FIG. 1 gives an example of the technique. FIG. 1 shows an analog form that is an identification card 101 which has a picture 103 of the card holder and an id number 107 for the card holder. Picture 103 further has embedded in it watermark 105 which can be recovered from a digital image made by scanning picture 103. Watermark 105's message is ID number 107. The arrangement thus permits verification that the person pictured in picture 105 really has ID number 107. Physical wear and tear on ID card 101 may render watermark 105 undecodable. The availability of ID number 107, however, makes it possible to do at least limited authentication of the ID card. For example, all of the ID numbers used in cards like card 101 may have the same general format and it may be possible to determine with certainty whether the message in watermark 105 has such a format. If it does not have, the photograph was not created in the correct/official way. Moreover, if it is known from the issuer's policies for issuing cards that cards issued at a particular location must have ID numbers with certain characteristics, it may be possible to determine whether the ID number in the watermark is one that has the same such characteristics as ID number 107. As will be explained in detail in the following, the determination may be made either absolutely or in terms of a probability.

The general principal embodied in the technique is this: (1) if the content has undergone a lossy transformation to the point that we cannot decode the message in watermark vector w" obtained from the content, and (2) we nevertheless have enough information to compute a watermark vector w' which is a replica of the watermark vector w in the original, it is possible to obtain information about the undecodable watermark by comparing w' with w". For example, if we have the message m used to make the watermark and also the function $f$ and the secret key K used to embed the watermark, the positions and values of the bits of watermark vector w' that is a replica of the watermark's watermark vector w can be computed, with $w'=f(m,K)$. We can then compare w' with w" to determine whether the content contains any watermark at all, and if so, the probability that the content contains a version of the original's watermark.

Generalizing still further, the technique can be described as follows: in order to determine whether a questionable content from which a message cannot be read contains any trace of the watermark it should contain or of a watermark which is related to the watermark it should contain, one must have the following information:

- one must know how the questionable content was derived from the watermarked original;
- one must know the message contained in the watermark, how it was transformed to make the watermark information, and how and where the watermark was embedded in the watermarked original.

Given this information, one can do the following:

1. put the questionable content into a form that is as close as possible to the watermarked original;
2. obtain a first watermark vector w" from the questionable content that corresponds to the watermark vector for the original of the questionable content.

These first two steps are generally done as part of the attempt to decode the message.

3. obtain a second watermark vector w' by recomputing the original watermark vector w from the message.
4. compare corresponding values in w' and w".

Depending on the degree of correlation between the values in the two lists, one can determine whether the questionable content contains anything at all like the original's watermark and if it does contain a related watermark, whether the message in the related watermark can be decoded correctly against an error detection code (which is part of the related watermark) from the related watermark or is one of a small set of messages that includes the message in question, and even whether it is the same message as the message in question. Of course, in all of these cases, the comparison may yield probabilities as well as yes-no results.

A specific example of the technique is the following: U.S. Pat. No. 6,359,985 discloses a watermarking technique that is applied to images whose digital representations employ block-DCT coefficients of the images. These block-DCT coefficients are termed features. In the watermarking technique, a predetermined subset of the features is extracted from the digital representation to form a vector of features. The watermark is embedded in the image by modifying the features in the feature vector. The watermark vector is a vector of the modified values in the features. To make an image from the digital representation, one simply reverses the transformation of the image into block-DCT coefficients.

If the technique for making a watermark disclosed in U.S. Pat. No. 6,359,985, supra is employed, then the technique of the invention may be applied to a copy of the digital representation that has undergone lossy transformation as follows:

1. Restore the digital representation to a form that is as close as possible to that of the original image.
2. Retrieve a watermark vector w" from the restored digital image that corresponds to the watermark vector w in the original.
3. Make a watermark vector w' which is a replica of the watermark vector w in the original image as follows:
    a. the message (M) is encoded as a bit stream (B) with a technique that permits error correction, for example BCH;
    b. B is further scrambled (encrypted) to produce watermark information I.
    c. the watermark vector w' is made from I.
1. Compare w' and w".
2. The similarity between w' and w" can determine the presence of the watermark message m. If the derived image was not derived from the original watermarked image, no correlations should be found between w" and w' (i.e. the similarity is close to 0).

Figure 2:
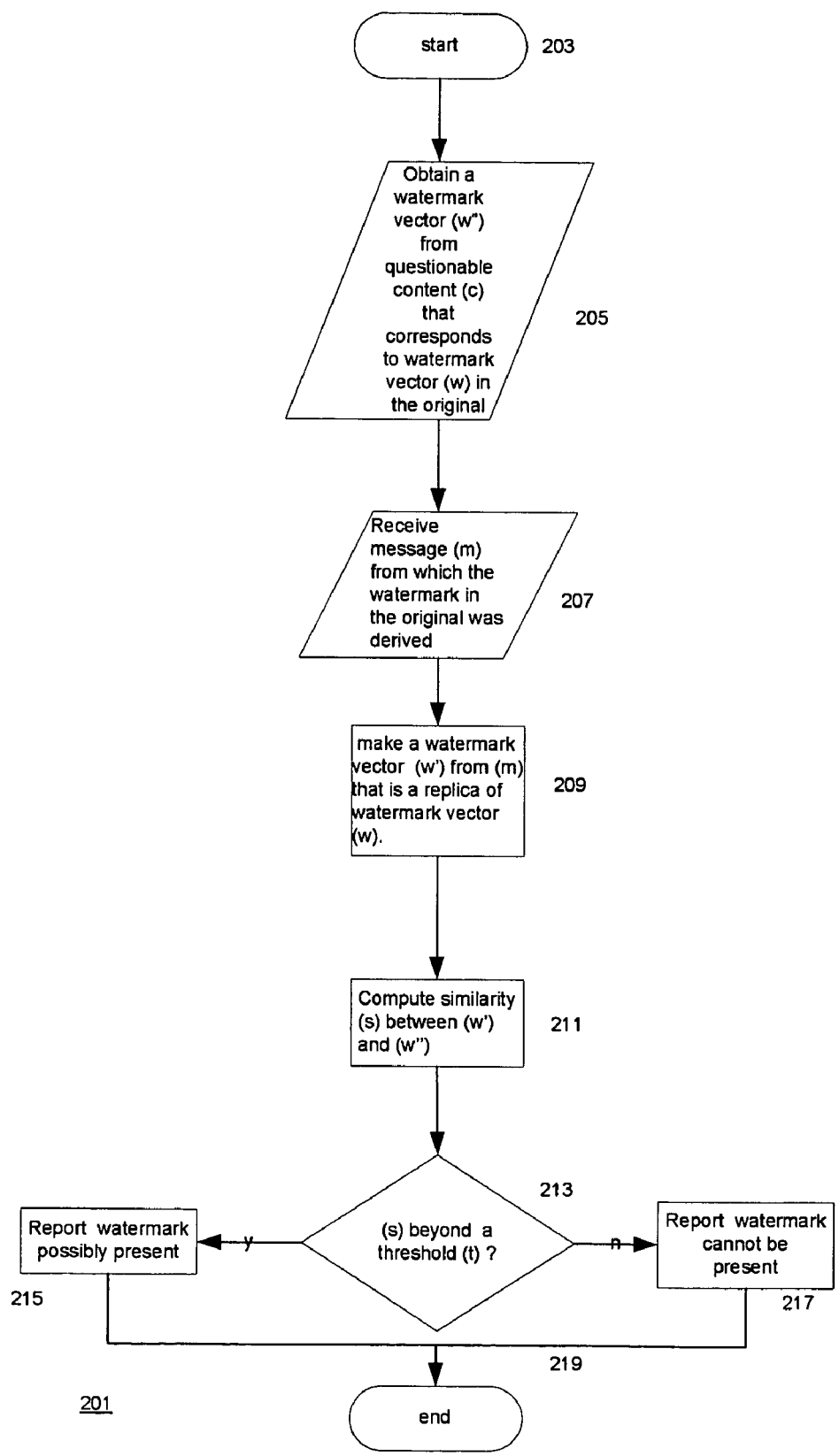
FIG. 2 is a flowchart of a method for determining whether there is a watermark in content that has undergone a lossy transformation.

Flowchart 201 of FIG. 2 shows the general technique. The processing of flowchart 201 is performed when an attempt to decode a watermark in questionable content c has failed. First, a watermark vector w" is obtained from questionable content c that corresponds to watermark vector w in the original from which c is supposed to have been made. (205) Generally, watermark vector w" will be the watermark vector from which the watermark detector attempted to read the watermark. Then a message m is obtained which was used to originally generate the watermark in the original from which c is supposed to have been derived (207). Next, in step 209, the message is used to make a watermark vector w' which is a replica of the watermark vector w in the original. How the replica is made will of course depend on how the original watermark was made. In step 211, the similarity s between w' and w" is calculated. If s is beyond a threshold, it is probable to the point of certainty that the watermark in content c is in fact a watermark of the same kind as watermark in the original from which c is supposed to have been made. It should be noted here that watermark vector w' can be any replica of watermark vector w, including a copy of the original watermark vector w.

As applied to the analog form of FIG. 1, the message m is ID number 107 and the questionable content is ID photo 103. Watermark vector w" is obtained by scanning photo 103 and making a digital image which is as comparable as possible with the digital image from which photo 103 was made. Once this is done, watermark vector w" is extracted from the digital image made from photo 103. The positions from which vector w" is extracted correspond to the positions of the watermark vector w in the original digital image. Watermark vector w' is made from ID number 107. Then watermark vector w" is compared to watermark vector w'. Of course, how much may be determined about watermark w" by the technique will depend upon how much of message m is available and how much of watermark vector w" is in fact present in the digital image made by scanning ID photo 103.

Figure 7:
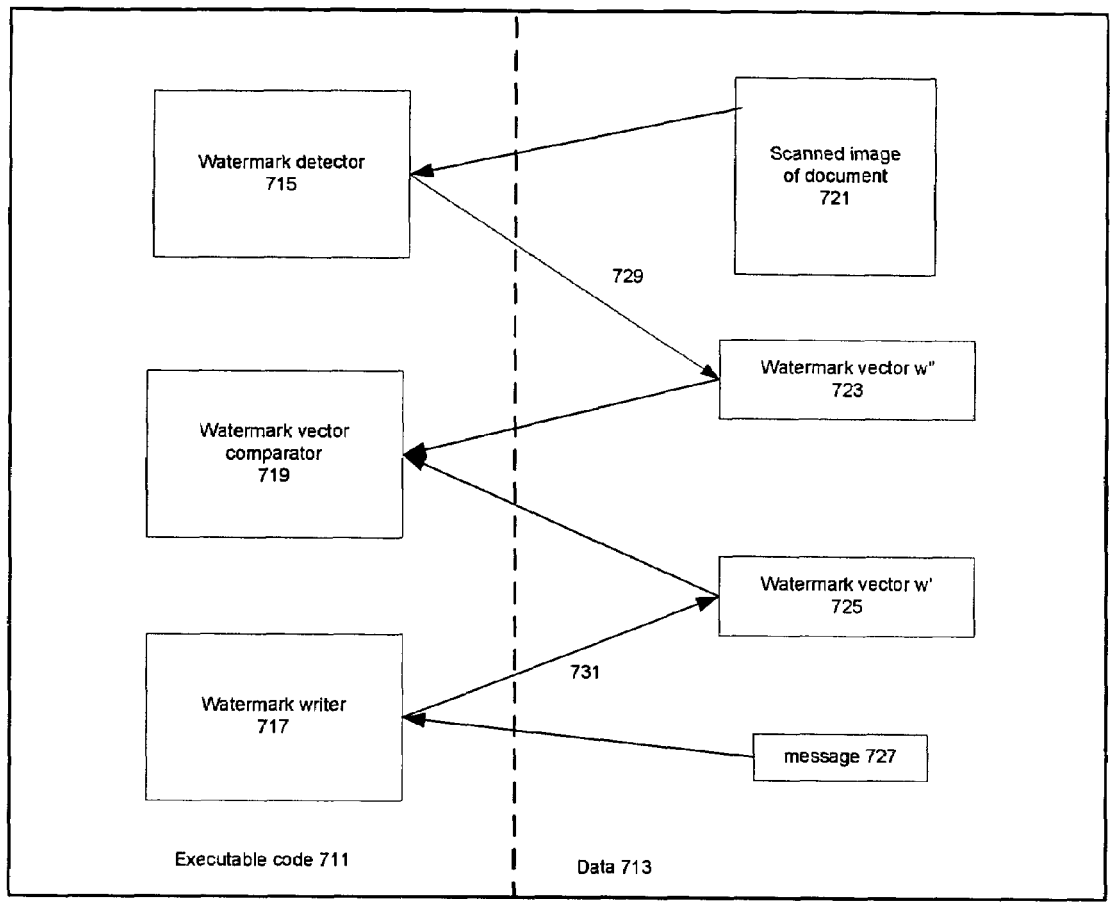
FIG. 7 shows an apparatus for determining whether there is a watermark in content that has undergone a lossy transformation.
Figure 7:
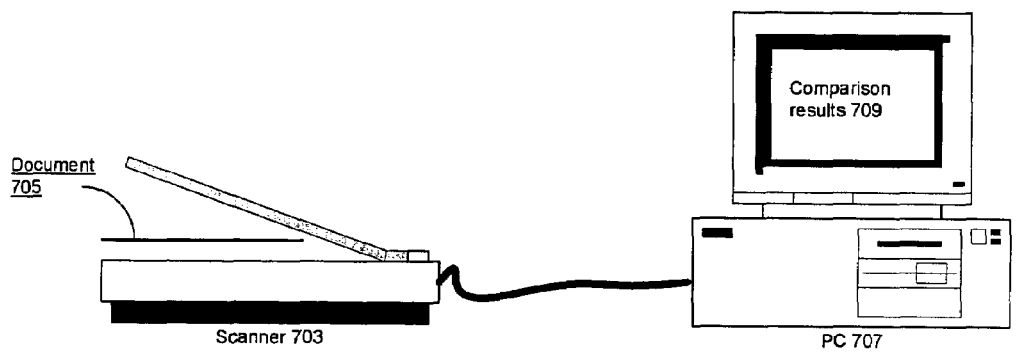

A System for Performing the Technique: FIG. 7

FIG. 7 shows system 701 for detecting watermarks from content that has undergone a lossy transformation. The main components of system 701 are a scanner 703 and a PC 707. An analog form such as identification card 101 appears as document 705 in scanner 703. Document 705 includes content which is supposed to be watermarked. At 710 are shown the components in PC data storage 710 that are relevant to the present discussion. The program components include watermark detector 715, which detects watermarks and reads their messages as described above, watermark writer 717, which writes watermarks, and watermark vector comparator 719, which compares watermark vectors. In the course of detecting a watermark, watermark detector 715 produces a watermark vector that contains the watermark that is supposed to be in the content. In the course of writing a watermark, watermark writer 717 produces a watermark vector of the values that are to be embedded in the watermark.

The data components include the scanned image of document 705, at 721, the watermark vector w" which watermark detector 715 extracted from scanned image 721, watermark vector w', which is a replica of the watermark vector w in the original of the watermarked part of document 705, and message 727, which is the message used to make the watermark in the original of the watermarked part of document 705.

Operation is as follows: In the course of attempting to read the watermark in scanned image 721, watermark detector 715 has extracted a watermark vector w" from the scanned image. If detector 715 cannot read the message from the values in watermark vector w", the system uses watermark writer 717 to make watermark vector w' from message 727. Watermark vector w' is a replica of the watermark vector w for the watermark in the original of the watermarked portion of document 705. The system then uses watermark vector comparator 719 to compare vectors w' and w". Comparator 719 outputs the result of the comparison to PC 707's display, as shown at 709. The result may take many forms, ranging from a simple "valid" or "invalid" message through graphical forms which show the strength of the watermark in various parts of the scanned image or which show areas in which the scanned image may have been altered.

Getting Additional Information About the Watermark's Message

Some ways of obtaining information about the watermark's message are: (a) prompting the user, (b) applying OCR technology if information is printed on document, (c) using a passport reader (d) reading a bar code, (e) reading a magnetic stripe, and (f) reading a smart card's memory.

Example 1: the watermarked content is a portrait printed on an ID card or passport. The watermark is made from watermark information that is a function of or dependent from a message which is the personal information or ID/passport/license number. The message can be printed in clear on the document or it can be contained in a bar code or can be accessible through a database. FIG. 1 shows an example of this technique.

Example 2: the image has been captured by a digital camera and contains a watermark with the camera number, date, etc. It is known at which date or from which camera the picture was taken. More generally, for these applications and others, the additional information may make it possible to determine that a specific message, or one of a subset of messages (e.g. we know the date the picture was taken but not which camera number), is embedded as a watermark in the image.

Exemplary Embodiments of the Techniques

A Secured Document

In one application, a secured document—e.g. an ID card or passport—has the following characteristics:

The whole document or a part of it contains a watermark that is made using watermark information that in turn was made using a certain message There is some information available that is unique to the document and/or to its possessor: personal information, an identification number, etc. This information can be in any form: textual, in a bar code, encrypted, etc. It may be contained in the document or can be supplied by a person.

The watermark information is made from a message that is associated with the information displayed on the document. For example, the message can be passport number from the document, a hash value made from the personal information in the document, etc. In most cases, there will also be a function that maps the message to the watermark information.

ID card 101 is an example of such a secured document.

Additional Details of Making the Watermarks

Additional details concerning how the watermarks may be made are the following:

When the watermark is made, a function $f$ maps the message m to the information I. This function can be a cryptographic hash function such as the MD5, SHA-1 hash function, or a digital signature.

The watermark can be in the frequency domain (e.g. DCT) and affect only certain coefficients determined by the key. But in many cases, given the set of available coefficients $C=\{c1, \ldots, cN\}$, the watermark vector w may correspond to certain values $w=w1, \ldots, wN$ taken by the coefficients, where some of the values can be null.

In another example, an image is divided into B blocks (of equal size) and the watermark generation function specifies for each block the value of the embedded bit (0 or 1) and which coefficients are used to embed the bit. If we only consider the values of the bits, then the watermark vector w is a sequence of bits.

Computing Similarity

There are many ways to compute the similarity between replica watermark vector w' and supposed watermark vector w" read from the content. A simple way is to sum the differences between the elements in w' and w". A classical way, found in I. J. Cox, J. Kilian, T. Leighton and T. Shamoon.

"Secure Spread Spectrum Watermarking for Multimedia", *IEEE Trans. on Image Processing*, 6, 12, 1673-1687, (1997), comes from spread spectrum technology. Given the watermark vector w', and a supposed watermark vector w", a similarity S is computed with:

$$S = \sum_{i=1}^{n} \frac{w'_i w''_i}{\sqrt{\sum_{i=1}^{n}(w'_i)^2 \sum_{i=1}^{n}(w''_i)^2}}$$

There are many ways in which the values in the two watermark vectors may relate to each other. All that is necessary is that it is possible to determine from the relationship whether a value in the watermark vector obtained from the questionable content indicates a value of a watermark. For example, suppose the values in watermark vector w' are single bits. In that case, w' is a sequence of bits, and so is watermark vector w" from the questionable content. Since the vectors are sequences of bits, the similarity between w' and w" can be measured by computing the fraction of bits that are the same:

$$S = \sum_{i=1}^{n} \frac{(w'_i = w''_i)}{\text{size}(w')}.$$

The threshold can be set according to a certain criterion. For example, one criterion can be: "the probability that a content not containing this watermark is detected as watermarked (false positive) must be under 1/1000000". Using a measure of similarity based on the fraction of the same bits, we know that for a non-watermarked image the average would be S=0.5 (50% of bits are the same). Using statistical tools, it is possible to estimate the probability that the similarity would be over, say 60%. Then the similarity for which the probability would be under 1/1000000 can easily be estimated.

Ways of Using the Information Obtained from Comparing w' and w"

When there is a known set of possible messages, the comparison can be used to obtain a probability that the message used to make w has been embedded vs. the probability that any of the other possible messages has been embedded.

Instead of outputting whether a watermark is present, output a probability that the content contains the watermark.

If w' and w" are compared using bit comparison, a confidence value can be attached to each bit detected in w". The confidence value indicates the degree of confidence the watermark detector has concerning the value of the particular bit and the confidence value can be taken into account in the similarity computation.

Figure 8:
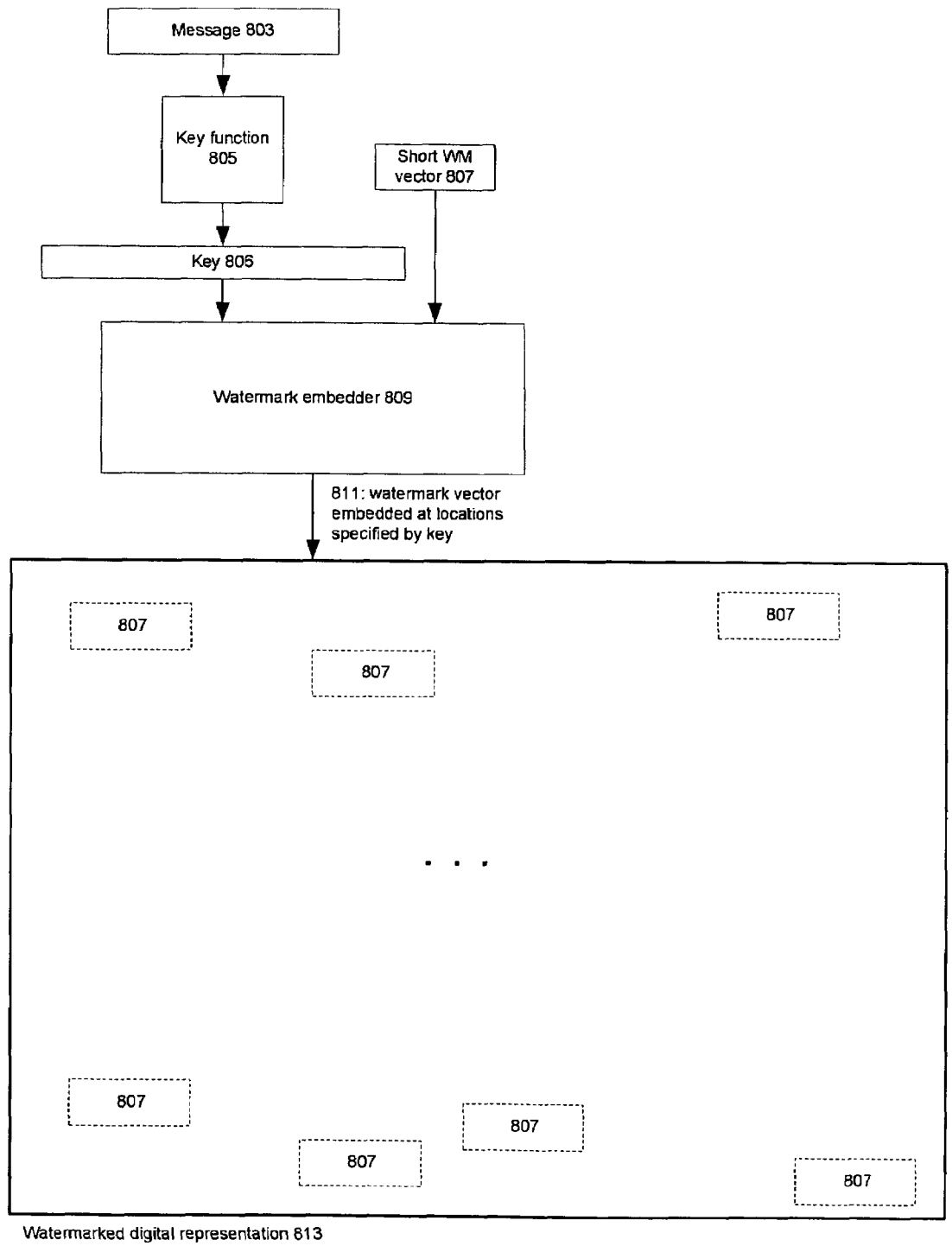
FIG. 8 shows how a watermark is embedded using a message-based key.
Figure 9:
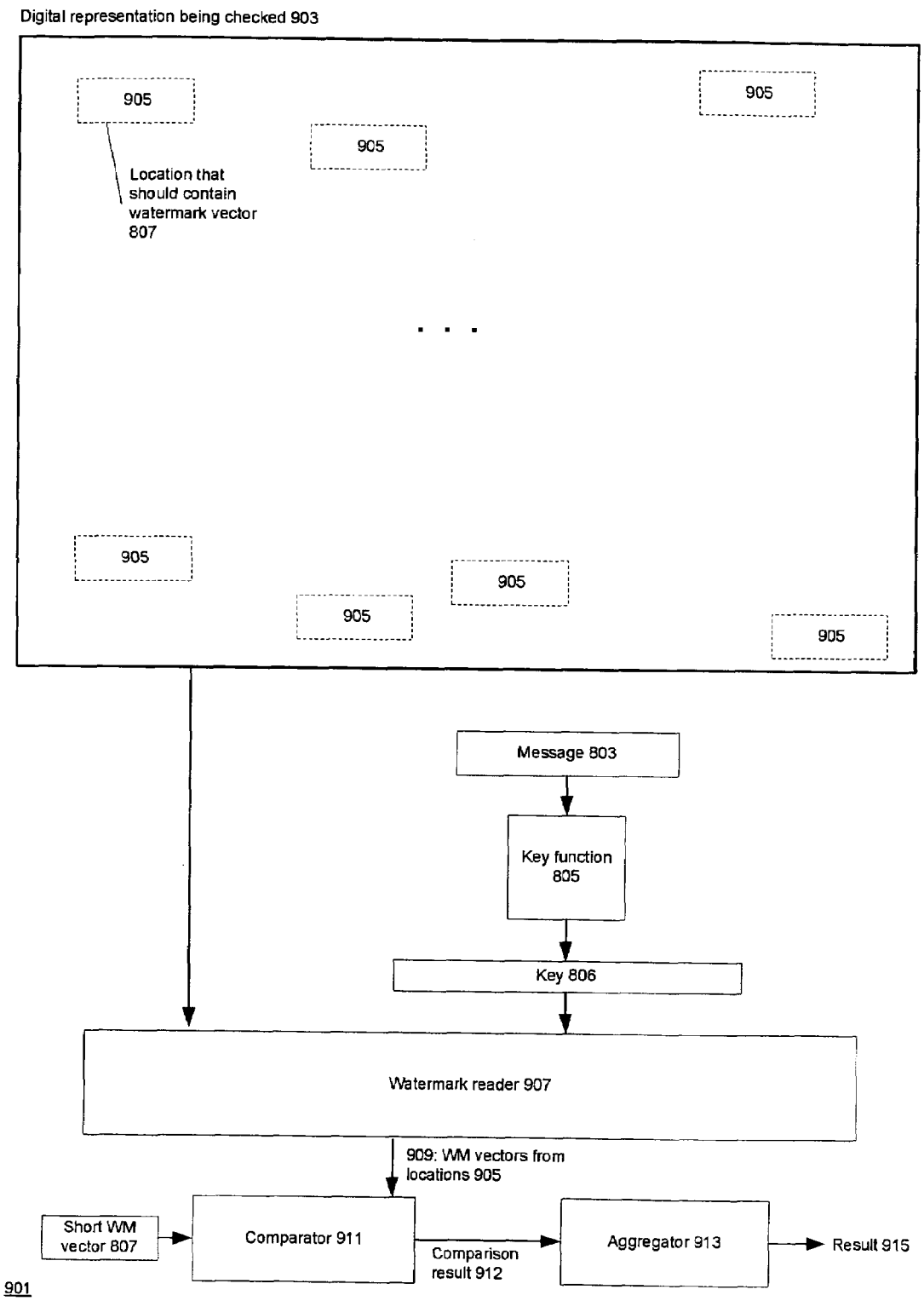
FIG. 9 shows a technique for determining whether a particular digital representation is derived from a digital representation which was watermarked using a message-based key.

Watermarks that are Embedded Using Message-based Keys: FIGS. 8 and 9

The standard application of digital watermarks is to hide a message in a digital representation. As illustrated by the previous discussion, one of the uses of such a message is validating or authenticating the digital representation: the digital representation being validated is believed to contain a watermark which contains a particular message; the watermark is read and its contents are compared with the particular message. If they agree, the digital representation is valid or authentic. When the digital representation has undergone a lossy transformation, the watermark may become unreadable; the techniques just discussed permit limited validation or authentication in such situations. A general problem with validation by means of messages contained in watermarks is that validation often involves long messages such as social security numbers or account numbers, while watermarks containing such long messages are less robust than watermarks containing short messages, and are therefore more likely to be rendered unreadable by lossy transformations.

A solution to this general problem is based on the observation that for validation or authentication purposes, there is no need that the watermark actually contain the message that forms the basis for the validation or authentication; all that is required is that a given watermark will be present in a digital representation only if the watermark was made using the message that forms the basis for the validation. In that case, there is no need for the watermark to be readable; instead, the mere presence of the watermark permits the digital representation to be validated. Moreover, because it is the watermark's presence and not its content that shows that the digital representation is valid or authentic, the watermark's content need do nothing more than indicate the watermark's presence and need be no longer than is required to do that; indeed, the watermark vector for a such a watermark need only specify the value of a single bit. This in turn makes such watermarks far more robust than watermarks that contain the message that forms the basis for the validation or authentication.

One way of making a watermark whose mere presence in a digital representation validates or authenticates the digital representation is to use the message to determine the location of the watermark in the digital representation. This is shown at 801 in FIG. 8. A key function 805 ($f$) is used to make a key 806(K2) from a message 803 (m): K2=$f$(m); where required, the function 805 may use a secret key K1_as well as m to make the key: K2=$f$(K1,m). Key 806 is then provided to watermark embedder 809 along with a short (minimum 1 bit) watermark vector WM 807 and watermark embedder 809 embeds a watermark made using watermark vector 807 at the locations in watermarked digital representation 813 indicated by key 806. The watermark is shown in FIG. 8 by the dotted boxes labeled 807 in digital representation 813. Since message 803 is now no longer contained in the watermark, but instead used to make key 806 and short watermark vector 807 need only be 1 bit in length, the length of the message has no effect whatever on the robustness of the watermark. As is well known in mathematics, there are many functions which can be used to generate key 806 from message 803 in a fashion such that key 806, and thus the watermark made with it, is unique to the message. The degree of uniqueness required may of course vary with the application. In some cases, the function may be an identity function, i.e., the key is the message itself. An advantage of the technique is that the function determines the length of the watermark key, and thus, the key can be made as long as is required for a particular application.

FIG. 9 shows at 901 a system that determines whether a digital representation 903 that is believed to contain a watermark made in the manner just described is authentic. Digital representation 903 contains a set of locations 905 that should contain watermark vector 807 if digital representation 903 is in fact derived from digital representation 813. The locations are at positions which in digital representation 813 were determined by key 806. The system that is doing the authentication obtains message 803 and also obtains or is in possession of key function 805. Key function 805 is applied to message 803 to produce key 806 as described above. The system then provides key 806 to watermark reader 907, which uses it to find locations 905. When a location is found, it is output to comparator 909, as shown at 909. Short watermark vector 807 is also in possession of system 901, and it is provided to comparator 911 to compare with the value of each of the locations 905 in turn. The result 912 of each comparison goes to aggregator 913, where the results are aggregated to produce overall result 915, which indicates whether the watermark that was embedded in digital representation 813 is present in digital representation 903. Comparator 911 and aggregator 913 can use any of the techniques previously discussed with regard to unreadable watermarks for doing the comparison and the aggregation. As described below for the techniques used with unreadable watermarks, the pattern of locations 905 that match the watermark in digital representation 813 may be used to show locations at which digital representation 903 has been altered.

In some applications, aggregator 913 will produce a visual result of the comparison. An example of such a comparison is shown at 501 in FIG. 5. There, the blocks to which the watermark was applied have different shades depending on the extent to which the presence of the watermark was detected. The lighter the block is, the stronger the presence of the watermark in the block. Because image 501 has undergone lossy transformations, the distribution of blocks with strong watermarks will not be the same as in the original, but the errors caused by the lossy transformations are random, and consequently, if the image is authentic, all areas which contain the watermark should have roughly the same distribution of light blocks as shown at 501, This visualization technique can of course be used as well with watermarks in which the message determines the watermark's contents.

Adaptive Embedding and Detection of Watermarks

In many applications of watermarking, the watermarks are applied to digital representations whose analog forms all have the same set of characteristics. For example, if the analog form is a driver's license, all of the driver's licenses will be made of the same materials and will have the same format. Further, the pictures on the licenses may all have been made with the same kind of camera and the driver's licenses may all be checked for authenticity using the same kind of scanning device. Knowledge of these common characteristics of the analog forms and their use can be used to determine where and how a watermark should be embedded in the digital representation and also to determine how best to read the watermark.

The common characteristics that are of interest are those that affect embedding the watermark in or reading the watermark from different parts of the analog form. For example, we may know that the watermark is hard to read in a certain area of the image and easy to read in another area. More generally, we may know, or at least have an estimate of, the probability that the watermark will be correctly read in each part of the image. This knowledge can be used in any desired way to adjust how the watermark is embedded in or read from different regions of the image and also to adjust the weight or importance assigned to watermarks read from different regions of the image.

Adaptive Detection

In one embodiment of the invention, ID portraits are printed on ID cards, passports, etc. Typically, a digital image is printed on a substrate which may be plain paper, plastic, or passport paper. Often, the background is plain white (or other color), and is not well suited for reliably holding watermark information. In other cases, the printer is able to distinguish the background from the foreground, and does not print on the background at all, making it pointless to place watermarks there.

In some cases, the paper on which the watermarked image is printed already has some patterns on it—e.g. passport paper—which can have locally different brightness, different patterns, etc. This preprinted image may then have different levels of interaction with the printed watermarked image, resulting in a varying detection reliability for different parts of the image. Also, in some cases a pattern may be printed on top of the watermarked image: a stamp or a hologram for instance. These locally printed patterns may either completely erase the watermark underneath, or diminish the reliability with which it can be detected.

Given a set of training images, that is a set of analog forms made from the original digital images, it is possible to scan the analog forms and estimate the probability that an area of the scanned image made from one of the analog forms will contain a correct watermark at all or that a watermark will be correctly detected in the area. Given the estimates of probability, a detection mask can be designed for the analog forms that indicates how various portions of an analog form are to be weighted during watermark detection. When the analog form is read for watermarks, the mask is applied to the analog form. The simplest kind of weighting is binary: a portion of the analog form is either included or excluded when detecting the watermark. The weighting may of course be more sophisticated; for example, it may specify the probability of detection of a watermark in a particular region of the analog form. If the watermark detector found one watermark in an area where the mask indicated a low probability of detection but another watermark in an area where the mask indicated a high probability of detection, the watermark detector could for example conclude that the watermark from the area specified by the mask as having a high probability of detection was more likely the correct watermark than the watermark from the area having a low probability of detection.

Figure 4:
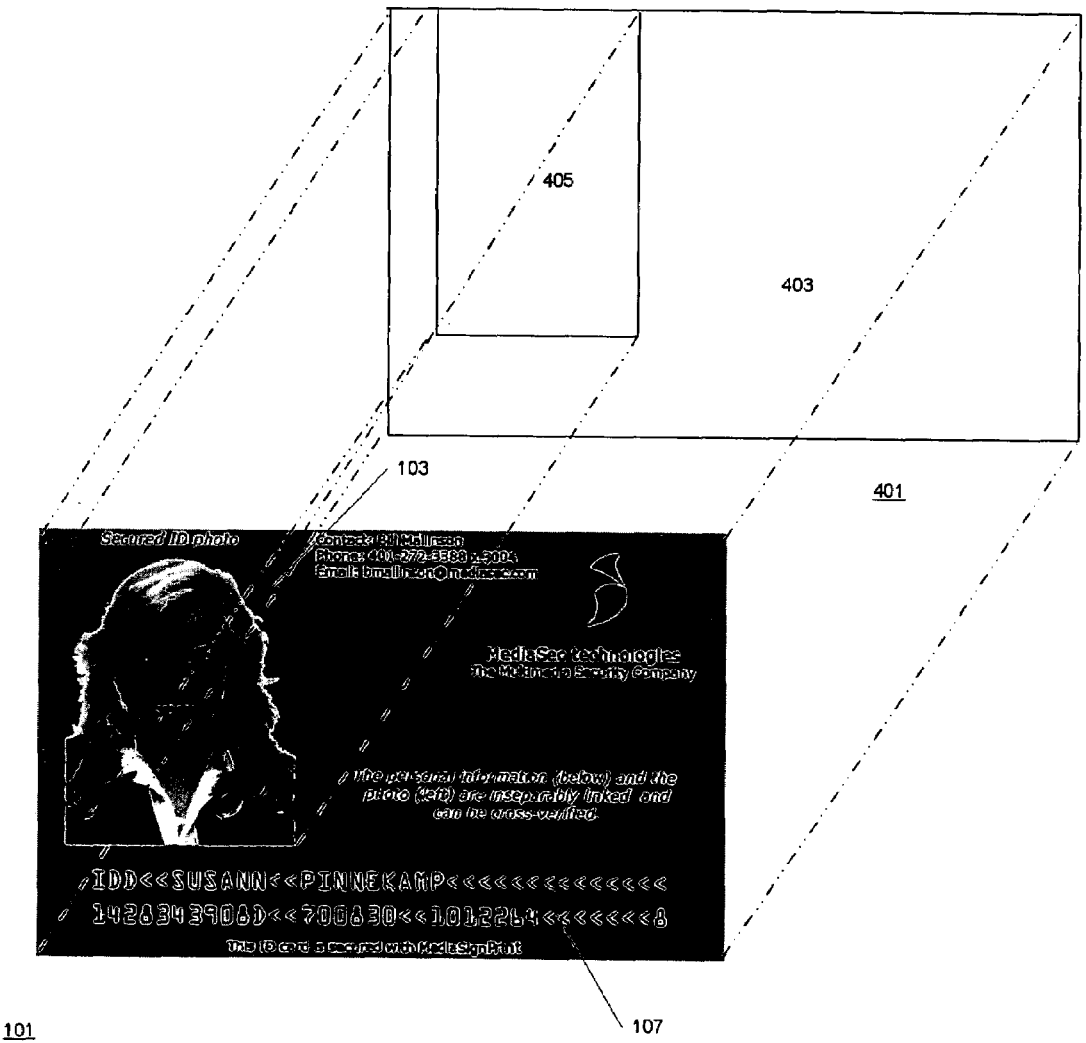
FIG. 4 shows an embedding mask used for adaptive embedding of watermarks.

FIG. 4 shows how a simple exclusion mask might be applied to ID card 101 of FIG. 1. The watermark is contained in ID photo 103. The watermark is not applied to the portion of the ID card that is outside ID photo 103. Thus, exclusion mask 401 excludes area 403 from watermark detection and the watermark detector is applied only to area 405.

Extensions

The detection mask may be made dynamically. For example, face recognition can be applied to ID photo 103 to locate the area of the face and from that, a part of picture 103 which may not be watermarked.

Taking into account the local strength of the watermark from adaptive embedding (explained below).

Taking into account luminance.

Taking into account edge information.

Taking into account the characteristics of the printer that will print the image as they affect color, details, and other aspects of printing quality.

Inserting a watermark into an arbitrary shape, a circle, or a complex shape such as a portrait, and taking this shape into account at detection time.

Adaptive Embedding

Just as knowledge about the analog form can be used to determine how and where the watermarks are read from the analog form, the knowledge can also be used to embed the watermark in such fashion that the watermark strength is locally adjusted in proportion to the amount of damage that the watermark will receive before detection. For example, if after the watermarked image is printed on the substrate, a hologram is added at a given location, the addition of the hologram will damage the watermark in that area of the image. In that area, the watermark can be omitted or inserted with more strength to limit the damage made by the hologram.

Also, for certain applications, certain areas are semantically less significant than others. For example with ID cards, the face is generally semantically more significant than the hair or the dress, because the face is more specific to the ID-card holder. This fact can be taken advantage of by embedding the watermark more strongly in the semantically less significant areas and less strongly in the semantically more significant areas. Thus, in ID card 101, the watermark may be less strongly embedded in the face than in the remainder of ID photo 103.

Adaptive embedding can be done using an embedding mask whose function is the reverse of the detection mask. For example, if watermarks were embedded using a simple exclusion embedding mask corresponding to exclusion detection mask 401, the watermarks would not be embedded in the areas of the analog form corresponding to areas 403 of mask 401, but would be embedded in the area corresponding to area 405 of mask 401. Instead of simply indicating areas where the watermarks are to be embedded or not embedded, the embedding mask can indicate the strength of embedding that is to be used in each area specified in the mask.

In general, we can distinguish three classes of characteristics of the analog form which may be adaptively taken into account when the watermark is embedded:

Semantic importance: some areas of the analog form have less semantic importance than others. For example, the background or the dress in an ID portrait has less semantic importance than the face. The embedding strength of the watermark can be locally adapted to reflect this distinction.

Processing characteristics: different areas of the analog form can be processed differently. For example the substrate on which the analog form is printed can have locally variable properties. Additional elements may be added to the analog form after the watermarked portion has been printed. Each kind of processing will have a locally different effect on the portion of the analog form to which it applies, and thus a locally different effect on the watermark.

Image characteristics: The different areas of the analog form can be affected differently during embedding and detection. For example, the printing/scanning technology can be less reliable for very dark or very bright areas. Theses areas vary for each image, for example for an ID photo of a person who has very dark hair or is dressed in black. The embedding can locally be adapted to take such characteristics of the image into account. Typical image characteristics include: edge, luminance, brightness, smoothness, and colors. The watermark's strength is adaptively adjusted according to these characteristics to achieve the best balance between invisibility and robustness.

Extensions

The areas of the embedding mask may be dynamically specified when the watermark is embedded. For example, face recognition software might be used to determine the area of an ID photo that contains the face.

Factors that may affect the reading of the watermark may be simulated when the watermark is embedded, with the locations at which the watermark is embedded and the strength of the watermark being adjusted accordingly.

For example, the resistance of the watermark to attack in different areas of the image may be tested by simulating one or more kinds of attacks and the watermark embedder may adapt to the results of the test by altering the places or strength of embedding to improve the reliability of the watermark in the face of one or more of the attacks.

It should be noted here that the techniques described above for adaptive embedding and detecting of watermarks can also be used with digital representations where different parts of a given digital representation are subject to transformations of varying degrees of lossiness. An example of such a digital representation is a digital representation of an image from which compressed versions are made according to a lossy compression scheme which compresses the background of the image more than the foreground.

Using Watermarks to Locate Alterations in Digital Documents and Analog Documents Made from Digital Documents One way of attacking a digital document or an analog form made from the digital document is locally modifying an image in the document or form to change its semantic content. Examples of local modifications can be:

modifying the plate number on the image of a car captured by a DVR on the scene of an accident/crime; or modifying areas of the portrait on an ID card; or replacing the portrait on an ID document.

If the document or form is watermarked, the counterfeiter's goal is to change the semantic content of the digital document or form without rendering the watermark incorrect or unreadable. In general, when a watermark is robust enough to be readable, it will not be difficult for the counterfeiter to make small changes in the document or form without rendering the watermark incorrect or unreadable. On the other hand, the very robustness of the watermark makes it useful for detecting and tracking alterations.

In order to use a watermark to locate an alteration, one need only know the locations at which the watermark is expected to be and its watermark vector. Since the technique does not require that the watermark have any particular content, the watermark vector need only be a single bit. Once the detector knows the watermark locations and the watermark vector, the detector can use the watermark vector w' which is a replica of the original watermark's watermark vector w and compare w' with the watermark w" in the questionable content. Differences between w' and w" may show whether the digital document or analog form that is the source of the questionable content has been modified and if so, which portions were modified.

In more detail, the detector compares the watermark vector w" in each subpart (termed herein a block) of the digital document or analog form with vector w'. The comparison indicates whether each block of the document or form holds the correct watermark information. In a digital document, if there has been no alteration, most blocks will contain the correct watermark information. With analog forms, the print-and-scan process deteriorates the watermark, and consequently, not all blocks will hold the correct watermark information (e.g. there can be in the order of 20% to 40% errors). These printing and scanning errors are generally of random nature and therefore can be expected to be distributed more or less uniformly on the analog form. Thus, if the image has been locally altered and has thereby lost its watermark in the altered areas, the watermark detector will respond to the altered areas in the same way that it responds to areas that are not watermarked. In doing so, the watermark detector detects the alteration. The technique can also be used to show the strength of the watermark in each area of the image.

The replica watermark vector used to detect alterations or watermark strength may come from any source. Examples include the original image, a watermark vector from the questionable content that has been successfully read, or a watermark vector which has been generated anew from the message. Adaptive embedding and detection may be used to increase the effectiveness of detecting alterations. For example, areas of the content that need special protection against change may receive watermarking of a greater strength than other areas of the content, and the greater strength of the watermarking in these areas may be taken into account when the watermarks are analyzed as described above. Of course, the technique as used to show the strength of the watermark in each area of the image may be employed to aid in the design of masks for adaptive embedding and detection.

Different techniques inspired by statistics, signal processing or pattern recognition can be applied to automatically detect areas that contain an abnormally large number of blocks that hold incorrect information (or no information at all). For example, one technique inspired from pattern recognition is to determining connections of incorrect blocks, and extract those connections that are higher than a threshold. Another technique would be to determine in all areas of size N×N of the analog form whether there are more than P incorrect blocks. Yet another technique from signal processing is to assign positive values to correct blocks and negative values to incorrect blocks and then low-pass filter the resulting matrix. The areas of the filtered matrix in which values are under a threshold are detected as having been altered. Finally, statistics can be applied in all approaches to characterize areas of the images that are not altered and those that are altered, and to determine detection parameters relatively to the user's expectation (e.g. minimum size of altered areas, probability of false alarm/rejection, etc). It is also possible to display to the user an image with the incorrect and correct blocks in different colors, to allow human interpretation of the data.

Figure 5:
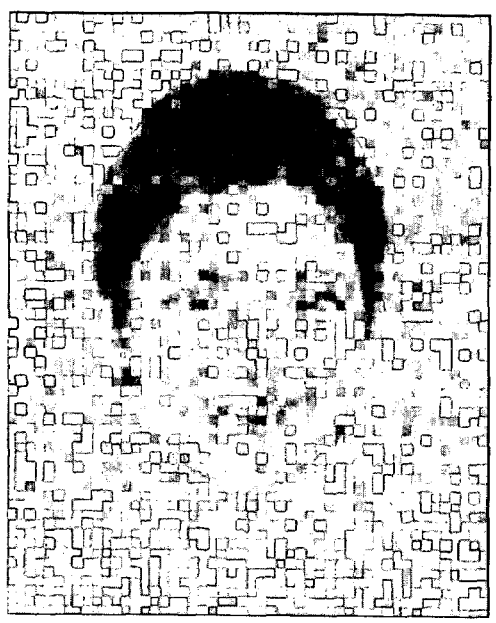
FIG. 5 shows GUIs for watermark detection and alteration detection.
Figure 5:
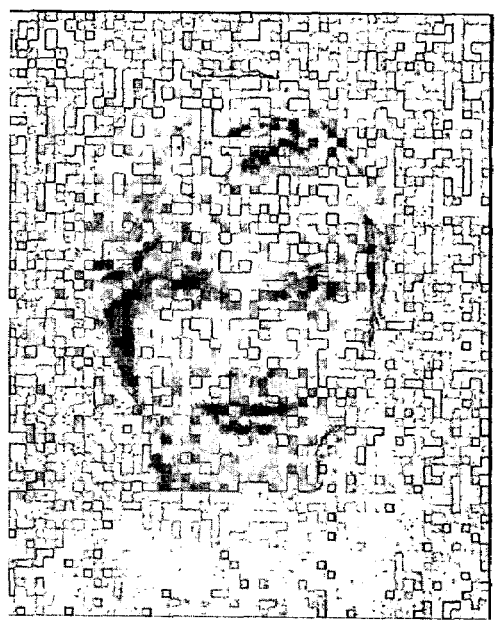
Figure 5:

FIG. 5 shows the effect of alterations on watermark strength and also provides an example of a graphical way of showing altered areas. Here, image 501 was modified after it was watermarked by replacing the face in with another face which was not watermarked in the way that the face in image 501 was watermarked. The result of the modification is image 502. When image 502 is compared with image 501, it will be seen that the facial area of image 502 is darker than the facial area of image 501. This in turn shows that the blocks in the facial area of image 502 are far more weakly watermarked than the blocks in the facial area of image 501. The weak watermark in the facial area of image 502 is of course a direct consequence of the modification. When a filter is applied that highlights areas with many weak blocks, the result is image 503, in which modified area 505 clearly stands out.

Extensions of the Technique

Detecting more than one altered area

Using external modules (e.g. face recognition), to focus detection of alteration on the most semantically significant areas (e.g. the eyes in an ID photo)

Multiple scanning of physical document to cancel out scanning variability.

If the watermark is unreadable, the alteration detection may be used for analyzing the reasons for its unreadability.

Using Registration Marks to Locate Watermarks

A watermark is embedded in a digital image using an encoding key. That key allows the detector to derive the exact position where each element of the watermark is inserted in the image. However, before the detector can apply the key to a test image which is thought to contain a watermark, the detector must perfectly "synchronize" the test image, i.e., position the test image such that to the extent possible, each that each item of data in the test image corresponds to the same item of data 1 in the original watermarked image. Only then can the encoding key be used to correctly extract each element of the watermark.

However, in many applications, the test image is not initially synchronized, but has been rotated, scaled, shifted, etc. relative to the original watermarked image. For example, if the test image is captured from an analog form using a flatbed scanner, any combination of rotation, scaling and translation is possible. In that case, it is well known that if three points of the captured image can be matched with the three corresponding points of the original watermarked image, the affine transformation can be reversed and the test image is synchronized with the original watermarked image. If the test image is captured from the analog form using a camera, then four points must be matched in order to reverse the perspective transformation made by the camera. If more points than the necessary 3 or 4 can be matched, then an optimization method can be used to find the optimal transformation.

The points needed to synchronize the test image may of course be part of the image. Typical examples of such synchronization points include lines that frame the area that contains the watermark, "+" marks that are positioned at the corners of the watermarked area, and small dots. There are three problems with all of these techniques:

To the extent that the marks or dots are easily visible, and therefore useful for synchronization purposes, they deface the image; Because they are visible, they are typically few in number and placed at the corners of the image; if one or more of the marks is lost, either because it were deliberately removed or as a result of wear and tear, the image cannot be synchronized; and Because the marks are visible, people who wish to remove or alter the watermark can also remove or alter the synchronization points.

Another approach to synchronizing a test image is disclosed in U.S. Pat. No. 5,832,119, Rhoads, Methods for controlling systems using control signals embedded in empirical data, issued Nov. 3, 1998. As explained at col. 70, line 54-col. 76, line 38, an imperceptible pattern is added to the entire digital representation. The pattern has the characteristic that a power profile made from the digital representation shows peaks when the digital representation is properly aligned. The power profile permits automatic synchronization of the digital representation.

In this invention, the synchronization marks cannot be automatically detected without the use of information that is not contained in the digital representation. The additional information permits location of the synchronization marks. Typically, there are many more synchronization marks than the minimum required for the synchronization and the marks are arranged in a non-regular pattern. The locations of the marks may be determined by a key, either absolutely within the digital representation or with reference to a feature within the digital representation. In the latter case, the feature permits an initial synchronization. When the marks are found, the test image can be synchronized with the original watermarked image. To make it easier for a detector to find a mark, the mark or the surrounding portion of the image may be altered and information about these alterations may be provided to the detector. It should be pointed out here that there are other applications for synchronization beyond detecting a watermark's presence or reading the watermark and that the synchronization techniques just described are useful in those applications as well.

Figure 3:
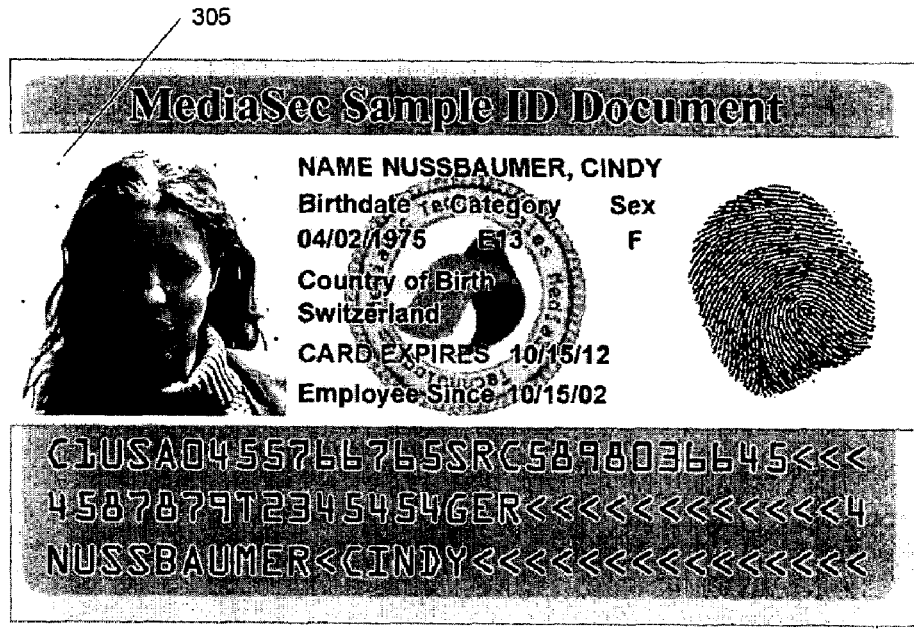
FIG. 3 shows how synchronization points may be used to locate watermarks in an image.
Figure 3:
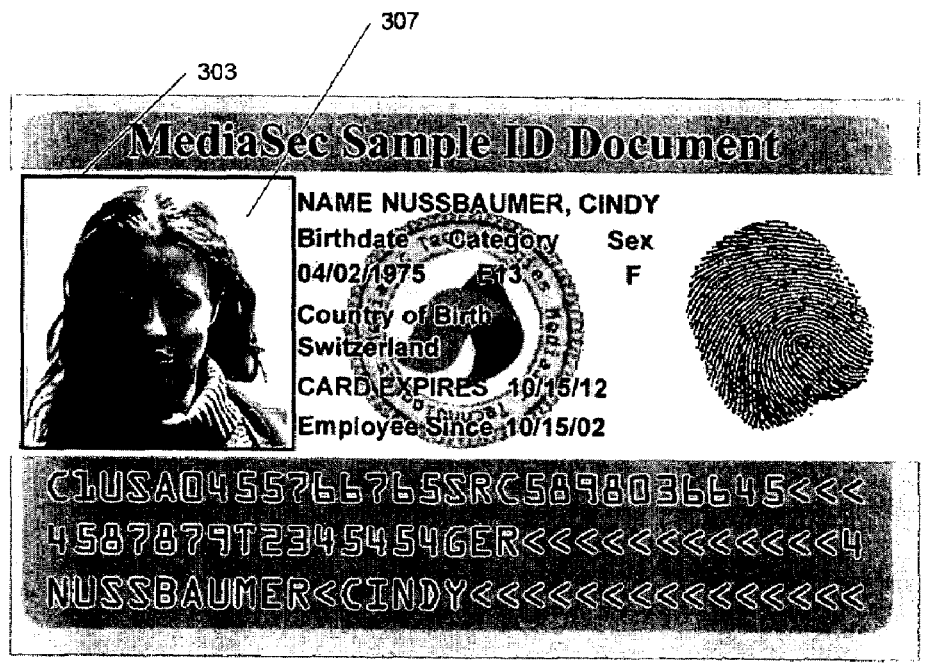

FIG. 3 gives an example of the technique. In ID card 301, photograph 307 has been watermarked. To properly synchronize photograph 301 with the digital representation from which photograph 307 is derived, rough synchronization is done using black frame 303. The remaining synchronization is done using dots 305 (shown in version 304 of card 301), which are located relative to frame 303. Of course in a real application, dots 305 would be invisible to the human observer.

Details of the Technique

Kinds of Marks

The marks can have arbitrary shapes: dots, squares, circles, corner marks, etc.

It is also possible to use already existing marks/elements (for example, the text lines, barcodes, graphics in ID cards, or a line or object in a hologram) in the document (analog or digital) for synchronization. Or to use both inserted marks and already existing marks.

It is possible to use the physical borders of an analog document which contains a watermarked image for synchronization. Examples are the physical borders of an ID card or hologram which has a predefined dimension.

More generally, the function of the mark may be performed by any arbitrary pattern that has been inserted into the image and requires information that is not contained in the digital representation for automatic detection. The marks may be inserted either in the digital representation or in the analog form of a document containing a watermarked image. Moreover, the marks can be inserted at different phases (before, during or after watermark embedding) using various techniques. For example, marks can be inserted by stamping, embossing, printing, etching or engraving with lasers.

Locations of Marks

The positions at which marks are inserted into the original watermarked image can be determined by a function which is dependent on factors such as a secret key or properties of the document. For example, they may only be inserted in areas where the neighborhood of the mark is such that it can be detected.

The marks that are used for synchronization should be relatively distant from each other and should not be on a line. When there are three marks, for example, they should define a triangle, the triangle should be as large as permitted by the image, and it should tend towards the equilateral. The triangular arrangement provides maximum protection against arbitrary geometric distortion in affine or perspective transformations.

The positions of the marks can also be selected manually. In that case, a parameter file or other information may be included to inform the detector about the positions of the marks.

Synchronization

It is possible to use already existing marks/elements in the image for synchronization. Or to use both inserted marks and already existing marks.

Several marks (e.g. 10 or more) can be inserted in an image. At detection time, the search range for each mark can be determined in a preliminary step of rough synchronization. Then each mark is attempted to be detected. For each mark, the most-likely position is determined;

sometimes there can be more than one position. A certainty factor such as a probability can also be output.

Making Detection of Marks Easier

When a mark's position is approximately known, detection of the mark is made easier if the mark's color is automatically adjusted with regard to the color of its neighborhood in the watermarked image. For example, if the area is generally white, the mark is black; if it is black or dark, the mark is white. To avoid the use of black/white, in a green background the mark can be red, etc. It is possible to automatically determine the mark color by analyzing the neighborhood.

If the mark is inserted in a noisy neighborhood, detection can be made easier if the neighborhood is flattened.

At detection time, the area can be analyzed, for example its degree of flatness, its color, and so on can be measured in order to determine if it is feasible to properly detect the mark in the area. A probability can be assigned to whether the location of the mark has been properly determined.

Using Marks

Once the marks have been found, they can be used to locate any feature of the test image, for example to determine the locations of the corners of the test image.

In general 3 points in the test image have to be matched with 3 points of the original image to determine the transformation (4 for a perspective transformation). If several marks are detected, and a factor indicating certainty of detection is associated with each mark, then the certainty factor can be used to choose the 3 marks that will be used to reverse the transformation.

The technique of embedding pseudo-random marks will work with video images and audio as well.

Detecting Synchronization Marks in Video Images

If a sequence of video images is treated as a sequence of still images, the techniques described above for detecting synchronization marks and using them to synchronize the image can be applied to the images in the sequence. However, the sequence of video images has the additional interesting property that if a transformation has been applied to one image in the sequence, it very likely has been applied to all of the images in a subsequence of the original sequence that includes the transformed image. Thus, if one frame of the video has been scaled, shifted or rotated, it is most likely that preceding and/or following frames will be scaled, shifted or rotated in the same way. In other words, it can be assumed that in a sequence of video images, geometric transformations are invariant in the time domain.

This property of invariance can be used to detect synchronization marks. A pattern made up of a certain number of fixed pixels is embedded in each frame. The embedded synchronization marks may be detected by accumulating a certain number of the frames and looking for pixels which have characteristics which differentiate them in the same fashion from their neighbors in all of the frames. These will be the synchronization marks. Once the synchronization marks have been found, they can be used as described above to reverse the transformation experienced by the frames of the sequence.

Details of the Technique

Embedding the Marks in the Frames

To embed the marks, select a pixel corresponding to each mark and change the value of each corresponding pixel by a predetermined amount. Since the pixels around a given pixel tend to have values like the given pixel, adding the predetermined amount will tend to differentiate the pixel chosen as a mark from its neighbors. For example, if four marks are desired:

select 4 pixels p1,p2,p3,p4 with respective value v1,v2,v3, v4 for each frame and v1 to v4, change value of $v_i -> v_i + A$, where A is a fixed value (e.g. A=+3) denoting the strength of the mark Detecting the Marks Since each mark has a characteristic which tends to differentiate it from its neighbors in a way that is the same for all of the marks, the marks can be detected by summing the images of a number of consecutive frames. In more detail, the method is the following:

Accumulate a sufficient number of consecutive frames, depending on the properties of the video and the strength A of the mark. Typically, 100 frames, or app. 3 seconds of video is sufficient.

Compute the image which is the summation of the accumulated frames.

Detect the marks using any appropriate dot detection algorithm.

Knowing the position of these marks in the original image, determine the transformation applied to the video.

Reverse the transformation.

Where the reason for reversing the transformation is to synchronize the images for watermark detection, the next step is detecting the watermark. That can be done in a single image using any of the available techniques; the watermark can be detected in the sequence of images by summing the watermark bit streams (the bits detected from the blocks containing the watermark) detected from the multiple frames without error detection within the frames, and then feeding the summed bit stream to an error correction decoder.

Extensions of the Method

Values of A

In general, an arbitrary, variable value for A for each pixel and each frame can be applied.

The variation of A in the time domain can be determined by a (secret) key, in order to prevent security attacks.

It is possible to alternate between positive and negative values for the mark in each frame, i.e. frame 1 has a change of +A, frame 2 of −A, frame 3 of +A, etc. The advantage of alternating values is that at detection time, we have to apply a similar operation to successive frames in order to detect the marks. This addition/subtraction operation quickly cancels out the redundancy in the successive frames, significantly reducing the number of frames required to detect the synchronization marks.

All of the techniques employed with synchronization marks generally can be employed with synchronization marks used in video frames. Thus, 4 marks are necessary to recover perspective transform. But in general, an arbitrary number of marks can be used to provide redundancy, and the most easily detectible marks may be selected for synchronization. Further, the marks can have arbitrary positions and the positions may be determined by a secret key. Finally, an arbitrary area surrounding a synchronization mark may be modified in an arbitrary way. For example, when a synchronization mark is in a noisy area of the image, detection may be easier if the neighborhood around the synchronization mark is flattened.

Calibration of Image Capturing Devices to Improve Watermark Detection: FIG. 5

For most if not all watermark detectors, detection of the watermark requires a digital image. However, for many applications, the watermark is, for the majority of its lifetime, embedded in an analog form. An image capturing device is necessary to make a digital image from the analog form, and it is this digital image that is input to the watermark detector. For example, if the watermark is embedded in an analog form such as printed paper, a flatbed scanner, a hand-held scanner, or a camera can serve as an image capturing device.

With some image capture devices, the impact of the analog-to-digital conversion on the watermarked image is limited by the controlled environment provided by the device. For instance, in the case of a flatbed scanner, the light conditions and the distance of the image capture element from the analog image are nearly constant. However, there is much more variability when the image is captured with a device such as a hand-held scanner or a camera: (1) the light conditions vary; (2) if held by a person, the capture device will have varying positions and orientations; (3) the analog form will also have varying positions and orientations; (4) The camera can be at a fixed location, but the document held by the user may still be at varying positions and locations relative to the camera.

The calibration techniques which will be described in the following involve three marks, which are termed in the following Mark1, Mark2, and Mark3.

Mark1: the marks on the analog document. The marks in the analog document may have been inserted into the document or naturally present in the document. They can visible under normal illumination or may require special illumination (for example, UV light) to be visible.

Mark2: the digital image of Mark1 (which is captured with an image capture device such as a scanner or camera). If special illumination is required to make Mark1 visible, the digital image is captured at least in part using that light. For example, the camera may have an ultraviolet flash.

Mark3: the watermark detection software permanently displays this mark on the screen at the fixed location, superimposed on the captured image of the analog document.

There is a Mark1, Mark2, and Mark3 for each class of document. For each class we know where to find the marks and what the marks look like. Mark1, Mark2, and Mark3 can have similar features such as color or shape. When the watermark detection device is set to detect the watermark for this class of documents (for example, drivers' licenses) the Mark3 for that class of document appears on the screen of the device.

We propose three general ways of using Mark1, Mark2, and Mark3 to reduce variability in capturing digital images:

Use the marks to help the user: to optimize the capture of the digital image, the user has to manipulate the analog image and/or the capture device until Mark2 and Mark3 match, either as regards location or as regards appearance.

Use the marks to help the capturing device: the device can make automatic internal adjustment, e.g. focus, lighting by matching Mark2 and Mark3. For example, if Mark2 is too fuzzy, the device will automatically focus. If the Mark2 is smaller than Mark3, the device will automatically zoom in.

The marks can be used by the capturing device to indicate to the user how to adjust the position of the camera or of the document. For example, if the device can tell from the marks that the document is too far away, it can display a feedback message asking the user to reduce the distance between the document and the detector.

Of course, it is possible to combine manual and automatic calibration. For example, once the manual calibration is satisfactory, the capturing device can use one or more Mark1s on the document to make an additional micro-adjustment before capturing the image.

Figure 6:
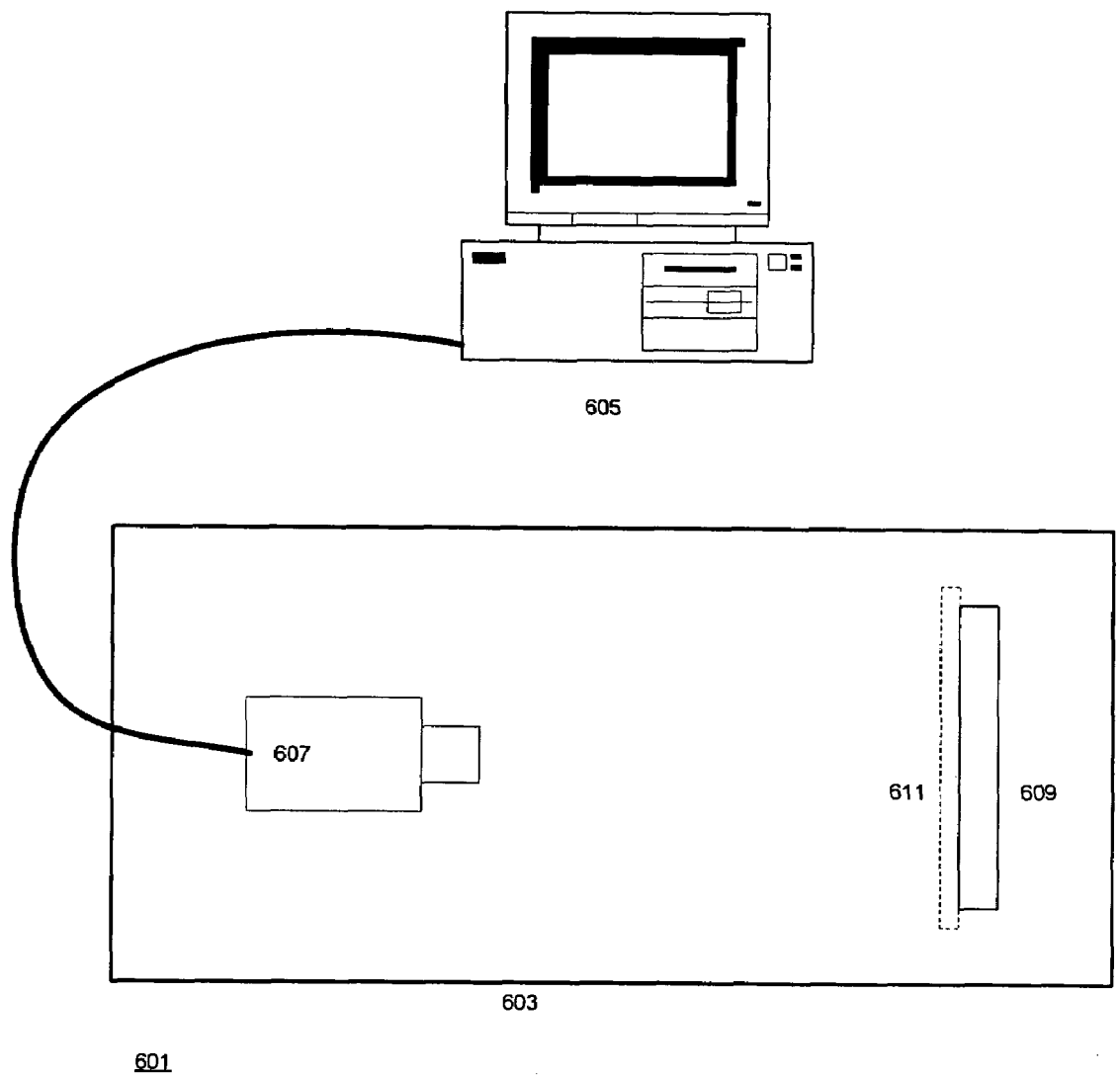
FIG. 6 shows a pre-calibrated board that is used for watermark protection.

Pre-calibrated Boards for Watermark Detection: FIG. 6

A simple way of ensuring that the camera has the proper distance and orientation relative to the document is to use a calibration board. A system 601 using such a board 603 is shown in FIG. 6 has the following properties:

board 603 can be made of an arbitrary material, e.g. wood, plastic, metal etc. It can have an arbitrary size, but in the case of webcams, a size of the order of US letter paper (8.5"×11") is typical camera 607 is at a fixed position on the board. To ensure that the camera does not move we can fix it with a suction cup, or simply glue it A support 609 to hold the document 611 is fixed in the same way (e.g. suction cup, glue, or other) at another position on the board. Any appropriate support can be used, for example a simple business card holder.

In addition, some calibration points and lines (not shown) can be displayed on the surface of the board The camera is connected to a processing device 605 (here, a desktop PC) that can detect the watermark from the received images.

When a user wants to read a watermark on the document, he or she just needs to place it at a natural position on support 609. Camera 609, which may always be transmitting images, transmits an image of a watermarked area of document 611 to processing device 605. If a watermark is detected by processing device 605, a display on processing device 605 may display any appropriate message.

Conclusion

The foregoing Detailed Description has disclosed techniques for obtaining information from watermarks whose content cannot be read, techniques for making and using watermarks where a message determines locations of watermarks instead of their content, techniques for using watermarks to determine portions of digital representations that have been altered, techniques that employ masks to embed and/or read watermarks at favorable locations in the digital representations, and techniques for synchronizing digital representations for watermark detection or other purposes. With regard to all of these techniques, the Detailed Description has described the best modes presently known to the inventors of employing their techniques.

As will immediately be apparent to those skilled in the arts to which the techniques pertain, the techniques disclosed herein are very general and have many applications other than those described herein. Thus, the examples in the Detailed Description generally deal with lossy transformations that result from printing a digital image and then scanning the printed image to produce a second digital image, as well as the lossy transformation resulting from wear and tear on the printed image, but the techniques described herein can be used to make watermarks more robust in the face of any kind of lossy transformation. Similarly, masks can be used to embed and/or read watermarks in any situation where different parts of the digital representation being watermarked have different properties with regard to watermarks. The synchronization techniques, finally, may be used anywhere where they are useful. Moreover, the techniques may be used with many different kinds of digital watermarking techniques and in many different kinds of digital representations. For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A method of obtaining information about a first digital representation of a sequence of images that may be derived from a second digital representation of the sequence of images, the second digital representation having a second watermark vector belonging to a second watermark embedded therein and the method comprising the steps of:
   an apparatus performing the following:
   extracting a first watermark vector from a portion of the first digital representation that corresponds to a portion of the second digital representation in which the second watermark vector is embedded;
   obtaining a comparison watermark vector that is a replica of the second watermark vector;
   computing a degree of similarity of the first watermark vector with the comparison watermark vector; and
   using the degree of similarity to determine a relationship between the first watermark vector and the second watermark vector, the determined relationship not being based on whether the degree of similarity indicates a match between the first watermark vector and the comparison watermark vector;
   wherein the step of extracting a first watermark vector includes synchronizing at least the portion of the first digital representation with the portion of the second digital representation, wherein the second digital representation includes synchronization marks that are locatable in the second digital representation using a secret key, wherein the secret key is used to locate the synchronization marks in the first digital representation which are used to synchronize at least the portion of the first digital representation.

2. The method of obtaining information set forth in claim 1 wherein:
   the portion of the first digital representation has undergone a transformation relative to the portion of the second digital representation; and the step of synchronizing includes the step of:
   reversing the transformation.

3. The method of obtaining information set forth in claim 2 wherein:
   the portion of the first digital representation and the portion of the second digital representation contain synchronization marks; and
   the relationship of the positions of the synchronization marks in the portion of the first digital representation to the positions of the synchronization marks in the portion of the second digital representation is used to reverse the transformation.

4. The method of obtaining information set forth in claim 1 wherein:
   in the step of obtaining the comparison watermark vector, the comparison watermark vector is a copy of the second watermark vector.

5. The method set forth in claim 1 wherein:
   the determined relationship indicates that an unreadable version of the first watermark vector is present in the portion of the first digital representation.

6. The method set forth in claim 1 wherein:
   the determined relationship indicates that an unreadable version of the first watermark vector is related to the second watermark vector.

7. A method of obtaining information about a first digital representation of a sequence of images that may be derived from a second digital representation of the sequence of images, the second digital representation having a second watermark vector belonging to a second watermark embedded therein and the method comprising the steps of:
   an apparatus performing the following:
   extracting a first watermark vector from a portion of the first digital representation that corresponds to a portion of the second digital representation in which the second watermark vector is embedded;
   obtaining a comparison watermark vector that is a replica of the second watermark vector;
   computing a degree of similarity of the first watermark vector with the comparison watermark vector;
   using the degree of similarity to determine a relationship between the first watermark vector and the second watermark vector, the determined relationship, not being based on whether the degree of similarity indicates a match between the first watermark vector and the comparison watermark vector;
   wherein the second digital representation includes synchronization marks that are locatable by summing information in a subsequence of the sequence of images, and the step of synchronizing at least the portion includes summing the information in the subsequence to locate the synchronization marks in the first digital representation, and using the synchronization marks in the first digital representation to synchronize at least the portion of the first digital representation, and wherein the information to be summed is locatable using a secret key, and the step of synchronizing includes the step of using the secret key to locate the information to be summed.

8. A method of obtaining information about a first digital representation of a sequence of images that may be derived from a second digital representation of the sequence of images, the second digital representation having a second watermark vector belonging to a second watermark embedded therein and the method comprising the steps of:
   an apparatus performing the following:
   extracting a first watermark vector from a portion of the first digital representation that corresponds to a portion of the second digital representation in which the second watermark vector is embedded;
   obtaining a comparison watermark vector that is a replica of the second watermark vector;
   computing a degree of similarity of the first watermark vector with the comparison watermark vector; and
   using the degree of similarity to determine a relationship between the first watermark vector and the second watermark vector, the determined relationship, not being based on whether the degree of similarity indicates a match between the first watermark vector and the comparison watermark vector;
   wherein the step of obtaining the comparison watermark vector comprises obtaining information from which the comparison watermark vector may be computed, and computing the comparison watermark vector from the information, wherein the information from which the comparison watermark vector may be computed includes a message, the message being represented by the second watermark vector and the message determining at least in part locations at which the second watermark vector is embedded in the second digital representation.

9. The method set forth in claim 8 wherein:

the information from which the comparison watermark vector may be computed includes a set of messages;

the message belongs to the set thereof;

in the step of computing the comparison watermark vector from the information, one or more comparison watermark vectors are computed using one or more of the messages in the set; and in the step of computing the degree of similarity between the first water mark vector and the comparison watermark vector, the similarity is computed for each of the comparison watermark vectors.

10. The method set forth in claim 9 wherein:

the determined relationship is a probability that the first watermark vector is computed from a message that belongs to a set of messages that includes the messages from which the set of second water mark vectors were computed.

11. The method set forth in claim 9 wherein:

the determined relationship is a probability that the first watermark vector is computed from a message that is one of the messages from which the set of second watermark vectors were computed.

* * * * *

UNITED STATES PATENT AND TRADEMARK OFFICE
CERTIFICATE OF CORRECTION

PATENT NO. : 7,630,511 B2 Page 1 of 1
APPLICATION NO. : 10/923946
DATED : December 8, 2009
INVENTOR(S) : Zhao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 830 days.

Signed and Sealed this

Second Day of November, 2010

David J. Kappos
*Director of the United States Patent and Trademark Office*